United States Patent [19]

Skinner et al.

[11] 4,215,868
[45] Aug. 5, 1980

[54] GASKET APPARATUS AND METHOD

[75] Inventors: Harry W. Skinner, Fort Wayne, Ind.; Alan D. Burdick, Aurora, Ill.

[73] Assignee: Press Seal Gasket Corporation, Fort Wayne, Ind.

[21] Appl. No.: 936,122

[22] Filed: Aug. 23, 1978

[51] Int. Cl.² ............................................. F16J 15/24
[52] U.S. Cl. .................................. 277/1; 277/DIG. 2; 285/189; 285/260
[58] Field of Search .................. 249/53; 285/189, 260; 277/DIG. 2, 207, 212 FB; 29/235

[56] References Cited

U.S. PATENT DOCUMENTS

| | | | |
|---|---|---|---|
| 3,406,988 | 10/1968 | Jones | 285/24 |
| 3,656,771 | 4/1972 | Stout | 277/207 A |
| 3,700,265 | 10/1972 | Dufour | 285/15 |
| 3,759,280 | 5/1976 | Smith | 4/52 |
| 3,866,925 | 2/1975 | Maimstrom | 277/164 |
| 3,958,280 | 9/1973 | Swanson | 137/363 |
| 3,973,783 | 8/1976 | Skinner et al. | 285/189 |
| 4,017,089 | 4/1977 | Kurata et al. | 277/212 FB |
| 4,103,901 | 8/1978 | Ditcher | 29/235 |

FOREIGN PATENT DOCUMENTS 175467 3/1917 Canada ...................... 285/260

Primary Examiner—Robert I. Smith
Attorney, Agent, or Firm—Gust, Irish, Jeffers & Rickert

[57] ABSTRACT

This invention relates to a gasket apparatus for providing a fluid tight seal between a pipe and a porthole in the wall of a manhole riser. The apparatus includes an elongated sleeve of elastomeric material, the sleeve having at one end an outwardly turned, reflexly curved annular flange. The body portion extends axially beyond the flange. A rigid reinforcing ring coaxially engages the inner surface of the flange, forming said flange to a predetermined outside diameter. This apparatus is inserted into the porthole in coaxial sealing relationship therewith. The flange is radially compressed between the ring and the wall of the porthole thereby providing a seal. The end of the pipe is received by the sleeve which is clamped at the distal end thereof onto the pipe to provide a further seal.

The method of forming the seal includes inserting a solid, substantially rigid ring into the end portion of an elastomeric elongated sleeve which thereby determines the outer diameter of the sleeve radially opposite the ring. The assembled ring and sleeve are inserted edgewise into the hole in a direction substantially parallel to the axis thereof with the assembled ring and sleeve lying in a plane also substantially parallel to this axis. The assembly is then forcefully rotated until it is coaxially positioned within the hole with the sleeve material being radially compressed between the ring and the wall of the porthole.

8 Claims, 17 Drawing Figures

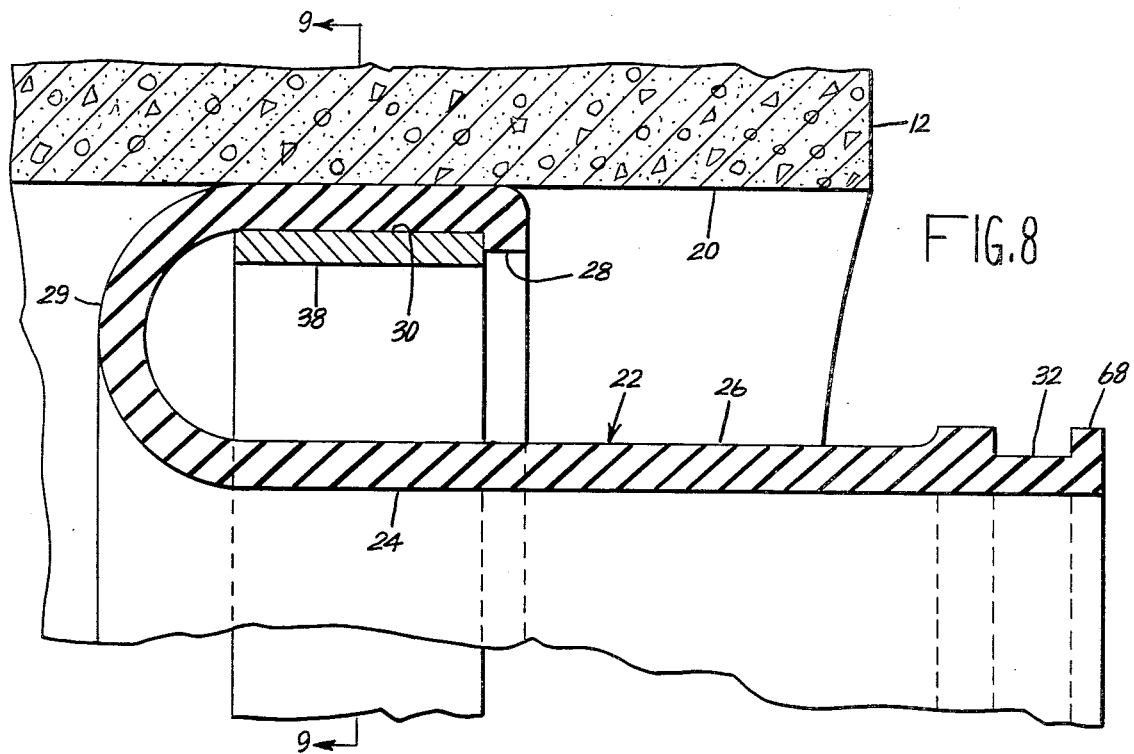
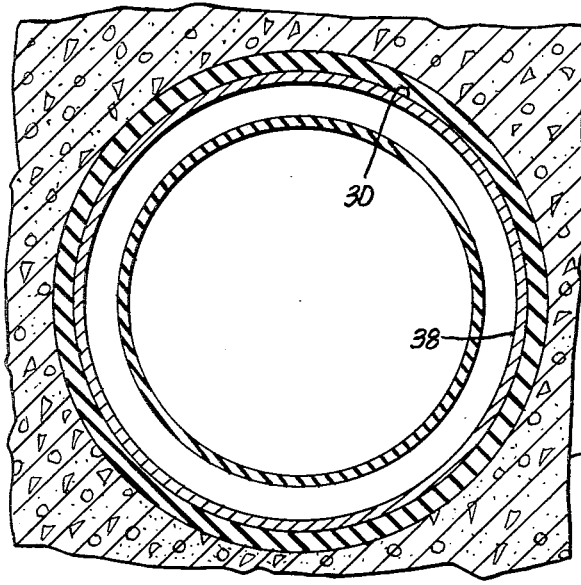
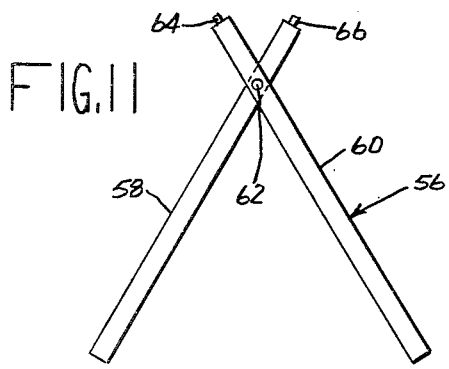
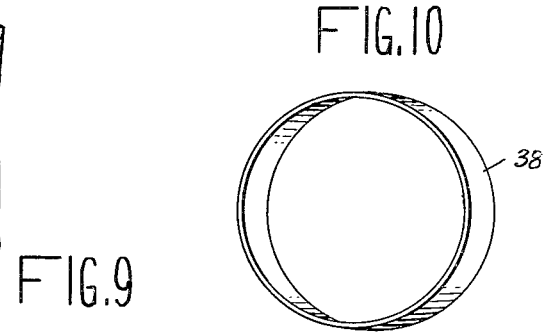
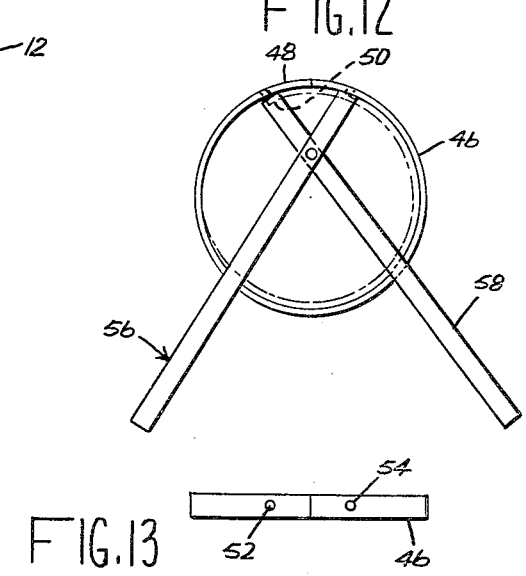

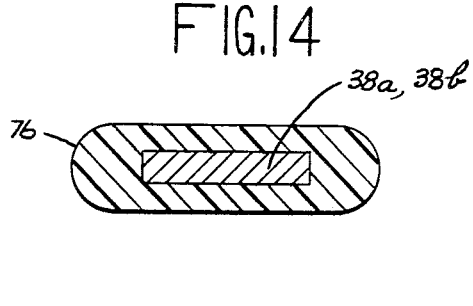
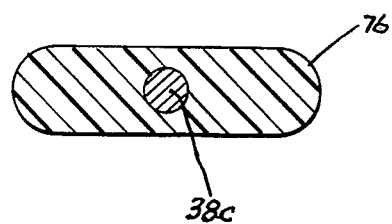
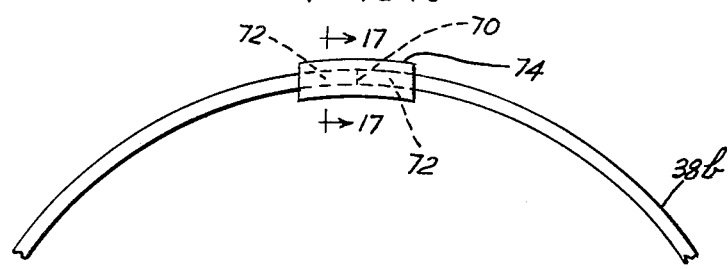
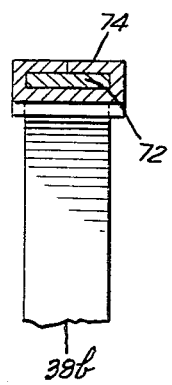

4,215,868

GASKET APPARATUS AND METHOD

BACKGROUND OF THE INVENTION

1. Field of the Invention

The present invention relates to sealing gasket arrangements and more particularly to sealing between the porthole in a manhole riser and a horizontally extending pipe connected to the porthole.

2. Description of the Prior Art

Prior art patents bearing some similarity to the present invention include U.S. Pat. Nos. 3,406,988; 3,656,771; 3,700,265; 3,759,280; 3,866,925; and 3,958,280. These patents variously relate to the provision of annular elastomeric gaskets which sealingly fit between the end of a pipe and the hole in another member for preventing leakage between the hole and the exterior of the pipe. In particular, U.S. Pat. Nos. 3,406,988; 3,759,280 and 3,958,313 disclose the use of sleeve-like gaskets having the exteriors at one end sealed to the wall of the hole and the opposite end sealed to either the interior or exterior of a joined pipe. The sealing of the one end to the wall of the hole is also variously achieved, one technique being to cast a radial flange on the sleeve into the concrete of the body containing the hole, and another being to clamp this flange against the exterior of the wall containing the hole by means of a steel or the like clamping ring. Still another arrangement involves inserting the gasket loosely into a hole followed by inserting an expandible split ring inside the gasket and then radially forcing the ring to an enlarged, expanded size for radially compressing the gasket against the wall of the hole. A still further arrangement is to drive a tapered tubular wedge into the gasket loosely installed in the hole for radially compressing the gasket against the wall of the hole.

SUMMARY OF THE INVENTION

This invention relates to a gasket device and method for installing the same in sealing relation with the wall of the porthole in a concrete riser or manhole and to an arrangement for connecting in sealing relation a pipe in communication with such a hole. In accordance with the method of this invention, a solid, substantially rigid ring is inserted into the end portion of an elastomeric elongated sleeve which establishes the outside diameter of the sleeve radially opposite the ring. The outer diameter of the sleeve with the ring installed is larger than the diameter of the hole in the manhole riser or the like into which it is being installed. The assembled ring and sleeve is force fitted edgewise into the hole in a direction substantially parallel to the axis thereof with the assembled ring and sleeve lying in a plane also substantially parallel to the axis. The assembly is then forcefully rotated until it is moved into a position coaxial with the hole thereby radially compressing the sleeve between the ring and the wall of the hole. The assembly is thus frictionally fitted and retained in the hole to seal against both infiltration and exfiltration. Alternatively, the assembled ring and sleeve can be forced coaxially into the hole.

The sealing device of this invention for providing a fluid tight seal between a pipe and a hole in the wall of a manhole or the like includes an elongated sleeve of resilient, elastomeric material, the sleeve at one end having an outwardly turned, reflexly curved annular flange. The body portion extends axially beyond the flange for receiving the end portion of the pipe. A rigid reinforcing ring is coaxially engaged with the inner surface of the flange thereby forming the flange to a predetermined outside diameter. This assembly is dimensioned to be slightly larger in diameter than the hole in the manhole into which it is to be sealingly inserted, such that once inserted, the flange is radially compressed between the ring and the wall of the hole so as not only to provide a seal but to frictionally retain the gasket assembly in place.

It is therefore an object of this invention to provide a gasket apparatus for connecting the end of a pipe to a hole in a wall of concrete or the like in sealed relation.

It is another object of this invention to provide such a gasket apparatus whereby the pipe may be laterally shifted or angled with respect to the hole without breaking the seal.

It is still another object of this invention to provide a method for conveniently installing a gasket apparatus in a porthole in a relatively simple and expeditious manner.

It is still a further object of this invention to provide a tool for installing an expansion ring in such a manner that the gasket will be sealingly compressibly engaged with the wall of the hole to be sealed.

The above mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 8 is an enlarged fragmentary sectional view of the gasket apparatus installed in the porthole;

FIG. 9 is also a fragmentary sectional view taken substantially along section line 9—9 of FIG. 8;

FIG. 10 is a perspective view of a solid reinforcing ring used in the preceding embodiment;

FIG. 11 is a side view of a scissors tool used in installing a split ring in the gasket device of the preceding figures;

FIG. 12 is a side view showing the tool of FIG. 11 in place to expand and lock a split ring into place;

FIG. 13 is a top view of the split ring of FIG. 12;

FIG. 14 is a cross-section of a metallic band encased in rubber;

FIG. 15 is a cross-section of a ring formed of a metal rod and encased in rubber;

FIG. 16 is a fragmentary side view of a metallic split ring banded to hold the ends together; and FIG. 17 is a cross-section taken substantially along section line 17—17 of FIG. 16.

DESCRIPTION OF THE PREFERRED EMBODIMENT

Figure 1:
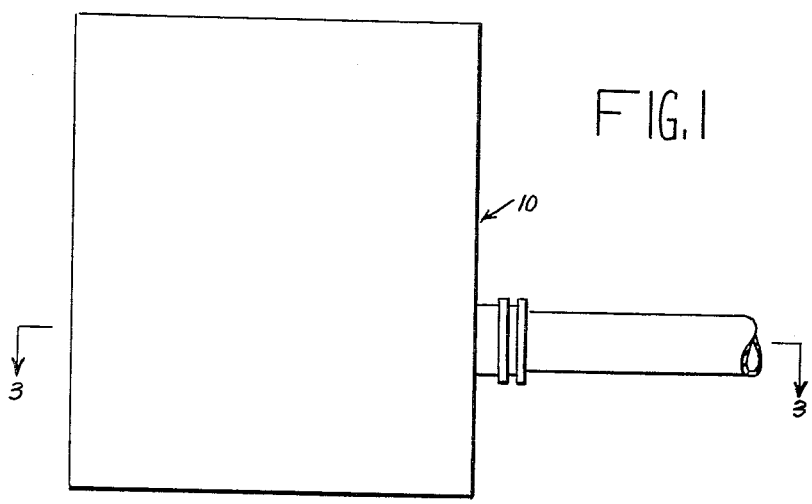
FIG. 1 is a side view of a typical manhole or manhole riser having a section of pipe laterally extending therefrom and connected to a porthole in the manhole by means of a gasket apparatus of this invention.
Figure 2:
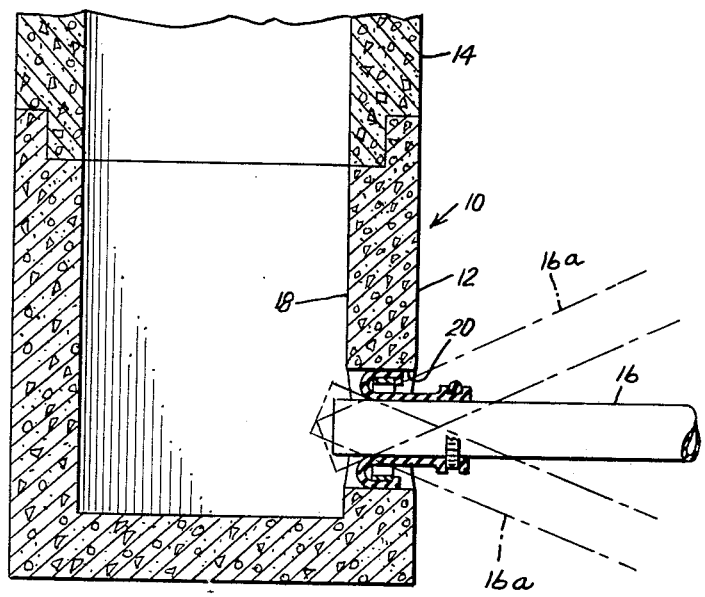
FIG. 2 is a partial vertical section of the embodiment of FIG. 1.
Figure 3:
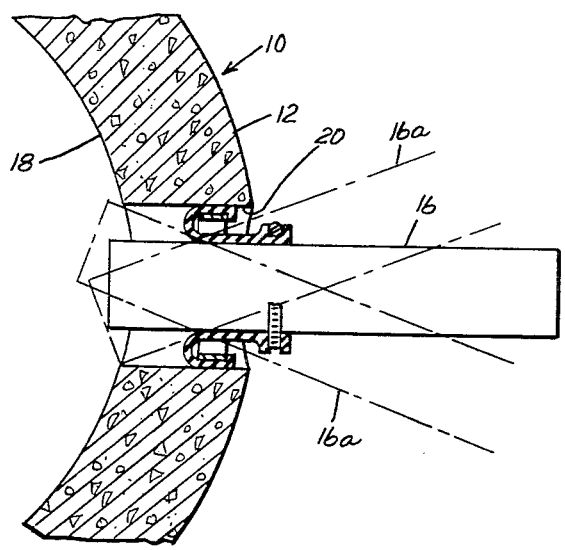
FIG. 3 is a horizontal section taken substantially along section line 3—3 of FIG. 1.

Referring to the drawings, and more particularly to FIGS. 1 through 3, a reinforced concrete manhole installation, generally indicated by the numeral 10 includes the base 12 and risers 14. This manhole construction is conventional and may conform to that disclosed in U.S. Pat. No. 3,759,280. As shown more clearly in FIGS. 2 and 3, a pipe 16 penetrates into the chamber 18 of the manhole via a porthole 20 in the wall thereof. While the drawings show the pipe 16 as protruding beyond the inner wall of the chamber 18, it may be positioned flush therewith or even inside without departing from the spirit and scope of this invention.

Figure 4:
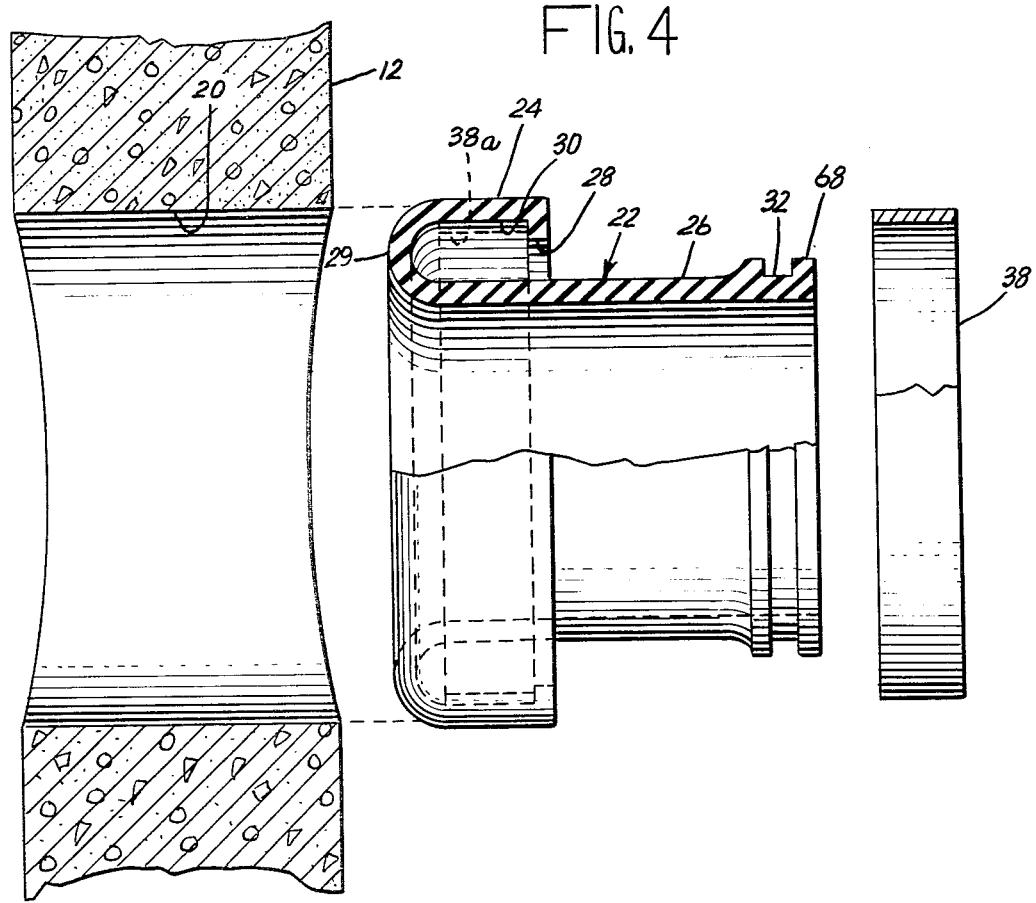
FIG. 4 is a fragmentary side view partly sectioned showing certain of the parts of this invention in spaced relation but with the outer flange formed with serrations.

To seal pipe 16 within the hole 20, a gasket apparatus is employed which is shown more clearly in FIGS. 4 and 8. The gasket device includes an elongated sleeve 22 of resilient, elastomeric material, such as rubber, neoprene or suitable plastic, provided at the left end with a reflexly curved annular flange 24 connected to the tubular body portion 26 thereof by means of a C-shaped annular section 29. The flange 24 has a radially inwardly protruding annular lip 28 which forms with the section 29 an annular retaining recess 30 with the inner peripheral surface of the flange 24.

Figure 7:
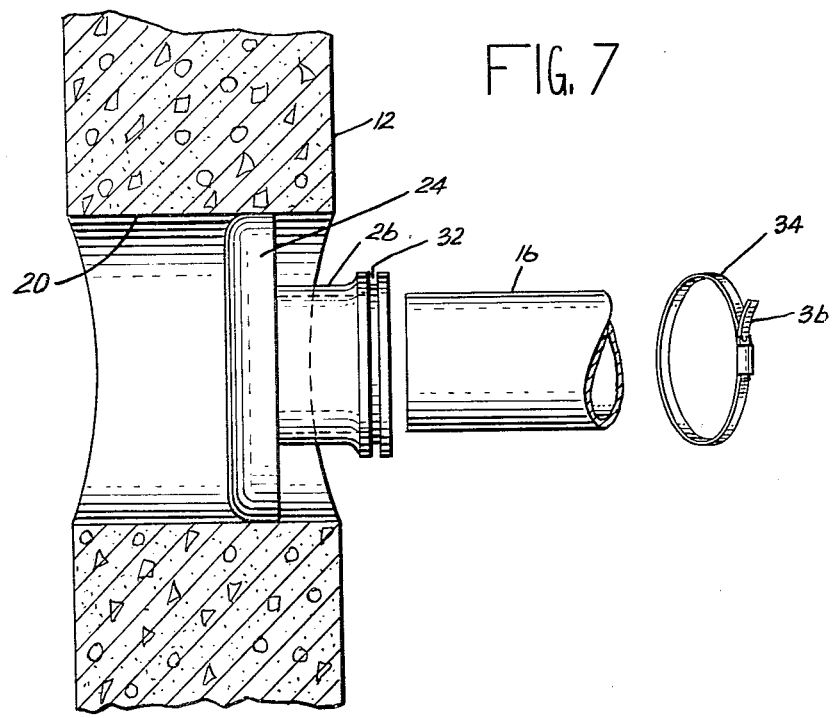
FIG. 7 is a view like FIG. 6 but with the gasket apparatus rotated into final, sealing position.

The body portion 26 may be of uniform diameter from end to end or alternatively may be tapered either outwardly or inwardly. As shown, it is of uniform diameter, being provided at the distal end with a circumferential groove 32 for receiving an adjustable clamping ring 34 (FIG. 7). The sleeve 22 is formed by extruding a strip of rubber to the cross-sectional shape shown in FIG. 4, cutting a length therefrom, forming an annulus of the length and vulcanizing the abutting edges. The clamping ring 34 is of conventional design and may be the same as that shown in either U.S. Pat. Nos. 3,759,280 or 3,958,313. In one form, it utilizes a threaded shaft resembling a screw provided with a head 36 slotted to receive a screwdriver whereby the band 34 may be altered in diameter and adjusted to provide a circumferential clamping force as is conventional.

A reinforcing ring 38 of steel or plastic and which is not transversely split into the cavity 30 in the position as indicated by the dashed lines 38a. This ring 38 is of band or tubular configuration and in one embodiment is of uniform diameter. Once it is fitted into the cavity 30, it establishes the outside diameter of the flange 24. The band 38 is retained in the annular cavity 30 by means of the lip 28 and the inside surface of the connecting section 29.

As shown more clearly in FIG. 4, the sleeve 22 with the band or ring 38 installed is to be inserted into the circular porthole 20. It will be noted that the diameter of porthole 20 is slightly smaller than the outer diameter of flange 24 with the reinforcing ring 38 installed. The reinforcing ring 38 is substantially rigid and inflexible.

Figure 5:
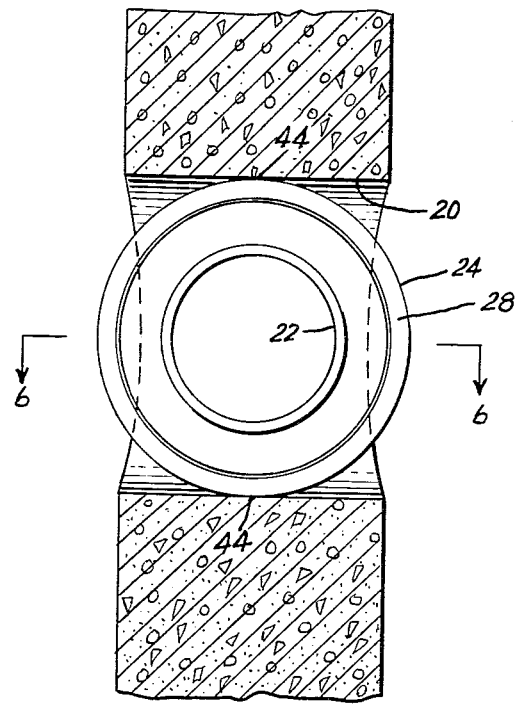
FIG. 5 is a view of a typical wall of a concrete manhole sectioned through a diameter of the porthole thereof and with one embodiment of the gasket apparatus of this invention partially installed.
Figure 6:
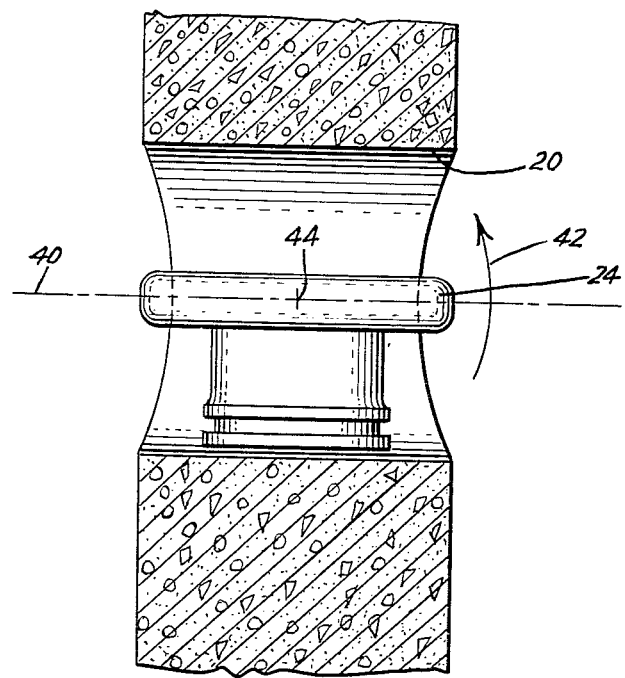
FIG. 6 is a section taken substantially along section line 6—6 of FIG. 5.

The method of installing an assembled sleeve 22 and ring 38 will now be explained, reference being made more particularly to FIGS. 5, 6 and 7. As shown in FIGS. 5 and 6, the sleeve 22 with the ring 38 installed within the flange 24 as an assembly is inserted edgewise axially of the porthole 20. In other words, considering that the lip 28 defines a plane, this plane is arranged substantially parallel to the axis 40 of the porthole 20 and the assembly 22, 38 thus positioned is moved along the axis 40 until it is inserted into the porthole 20 a suitable distance. Since the porthole 20 is of smaller diameter than the flange 24, obviously some force will be required in inserting the sleeve assembly into the porthole 20.

Once inserted, the sleeve assembly 22, 38 is rotated in the direction of the arrow 42 (FIG. 6) about the diametral centers 44 of contact (FIG. 5) between the flange 24 and the wall of the hole 20 until the assembly is positioned as shown in FIG. 7 with the sleeve assembly 22, 38 coaxial with the porthole 20. Some force will be required in order to rotate the assembly into the position of FIG. 7, since the material of the flange 24 will necessarily have to deform as it is moved into its final position. In this position, the material of flange 24 is under radial compression between the reinforcing ring 38 and the wall of the porthole 20. The sleeve assembly is thus frictionally fitted into intimate engagement with the wall 20 thereby retaining it in position and further providing a seal against leakage.

As shown in FIG. 7, the distal portion 26 projects beyond the outer wall of the base 12 there to receive the end portion of an underground pipe 16 which may be of plastic, concrete or the like. Once the pipe 16 is inserted to the position shown in FIGS. 2 and 3, the clamping ring 34 is installed in the groove 32 and the clamping screw 36 adjusted to clamp tightly the end of the sleeve 22 around the pipe 16 to provide a seal. As shown in FIGS. 2 and 3, the end of the pipe 16 is thus supported centrally of the porthole 20 with the space between the pipe 16 and the wall of the porthole 20 being sealed by the sleeve or gasket assembly.

While the ring 38 has thus far been described as being solid and not split transversely, reference may be had to an alternative design in FIGS. 16 and 17 wherein the ring 38b, of the same size and shape as ring 38 (FIG. 10), is split at 70 with the ends 72 abutting. A metallic band 74 is intimately securely wrapped around end portions 72 to hold them rigidly in place thereby forming the closed ring 38b. For this embodiment, the ring 38b may be cut from straight stock which is then formed into annular shape, the band or retainer 74 then being wrapped around the end portions thereby to form a rigid ring in which the end portions 72 are prevented from overlapping.

As shown in FIGS. 14 and 15, the metallic rings 38, 38b and 38c of circular cross-section may be encapsulated or encased in 60 to 80 durometer rubber 76, thereby to protect the metal from corrosion. The ring 38c is illustrative of other cross-sectional shapes being possible, this ring being of rod stock formed into the shape of a circle with the ends banded or welded as may be desired. The cross-section of rings 38, 38b is preferred, however. So formed, the rings of FIGS. 14, 15 and 16 are installed the same as ring 38.

Instead of initially inserting the assembled boot 22 and ringe 38, 38b, 38c edgewise as depicted in FIGS. 5 and 6, it may be preferred in some instances to insert the assembly coaxially of the hole 20 and then force it into place. Preferably, the assembly is inserted into hole 20 from the inside of the base 12. A suitably strong stick of wood, such as the end of a hammer handle, is positioned against annular portion 29 and then impacted by a sledge hammer to drive it an increment into hole 20.

This is repeated about the circumference of annular portion 29 until the flange 34 is driven into position in hole 20.

Referring once again to FIGS. 2 and 3, once the pipe 16 is installed, it can be universally angled to the positions shown in the dashed lines 16a. Further, because of the flexibility and elasticity of the connecting section 28 of the sleeve 22, the pipe section 16 may also be moved laterally without breaking the seal with the porthole 20, the radial clearance between the flange 24 and the body portion 26 permitting some appreciable movement laterally. Thus, if during an installation should backfill impose unequal lateral loads on the pipe 16, the pipe 16 can adjust relative to the position of the porthole 20 without disrupting the seal or imposing any undue structural loads on the pipe or the base 12 by reason of direct engagement therebetween.

Another embodiment of this invention is shown in FIGS. 11, 12 and 13. Instead of using a solid ring 38, a resilient split ring 46 of steel or plastic is employed. This split ring 46 is preformed to have overlapping end portions indicated by the numerals 48 and 50. These end portions 48 and 50 are provided with two holes 52 and 54. A scissors tool indicated generally by the numeral 56 has two legs 58 and 60 pivotally connected at 62. On the distal ends of the legs are provided projecting pins 64 and 66 which are engageable with the holes 52 and 54.

In use, the boot or sleeve 22 is first coaxially inserted into the porthole 20. The split ring 46 in contracted condition as shown by the dashed lines in FIG. 12 is inserted within the cavity 30 of the flange 24. The tool 56 is manipulated to insert the pins 64 and 66 in their respective holes 52 and 54 and then operated to spread the end portions 48 and 50 until the ring ends are disposed in juxtaposed engagement. The ring 46 thus expanded, the tool 56 is relaxed permitting the facing ring ends to remain abutted whereupon the material of the flange 24 is radially compressed outwardly into sealing engagement with the wall of the porthole 20.

In the following are given dimensions of a working embodiment of this invention, these dimensions being exemplary only and not to be considered as limitative of the invention.

| | |
|---|---|
| Overall length of sleeve 22 | 5.40 inches |
| Overall length of flange 24 | 2.40 inches |
| Axial length of lip 28 | 1.375 inch |
| Depth of recess 30 | 0.313 inch |
| Radius of curvature of the outer surface of section 29 | 0.712 inch |
| Radius of the curvature of the inside surface of section 29 | 0.40 inch |
| Thickness of the wall of sleeve 22 | 0.312 inch |
| Width of the groove 32 | 0.625 inch |
| Depth of the groove 32 | 0.188 inch |
| Inner diameter of sleeve 22 | 9.98 inch |
| Outer diameter of enlarged portion 68 | 0.50 inch |
| Outer diameter of ring 38 (for 12 inch hole) | 11.22 inches |
| Radial thickness of ring 38 | 1/8-3/16 inch |
| Length of ring 38 | 1.5 inches |
| Material of sleeve 22 | 60 durometer rubber |
| Typical diameter of porthole 20 | 12 inches |

While there have been described above the principles of this invention in connection with specific apparatus, it is to be clearly understood that this description is made only by way of example and not as a limitation to the scope of the invention.

What is claimed is:

1. A method of forming a seal with a circular hole in a wall comprising the steps of
    (a) inserting a substantially rigid ring into the end portion of an elastomeric resilient elongated sleeve thereby determining the outer diameter of said sleeve radially opposite said ring, the outer diameter of said sleeve with said ring inserted being larger than the diameter of said hole,
    (b) force fitting said assembled ring and sleeve edgewise into said hole in a direction substantially parallel to the axis thereof with said assembled ring and sleeve lying in a plane also substantially parallel to said axis, and
    (c) forcefully rotating the thus force fitted assembly into a position in which it is substantially coaxial with said hole and with said sleeve being compressed between the wall of said hole and said ring thereby providing a seal.

2. The method of claim 1 including the step of sealing the other end portion of said sleeve to the end portion of a pipe positioned to extend away from said hole.

3. The method of claim 2 wherein said sleeve is flexible between the ends thereof and said pipe is of a diameter smaller than said hole, said pipe end portion being received by said sleeve, and clamping said other portion of said sleeve to the outer surface of said pipe.

4. The method of claim 3 wherein the first-mentioned end portion of said sleeve is in the form of a reflexly curved flange, said ring being inserted inside the outer portion of said flange in radially spaced relation from the opposite portion of said sleeve, said outer portion of said flange having an interference fit with said hole.

5. The method of claim 4 wherein said sleeve has a tubular portion extending beyond said flange, said ring and sleeve assembly being inserted into said hole such that said tubular portion extends exteriorly of said hole in coaxial relation therewith.

6. The method of claim 5 including forming said hole in the wall of a manhole riser.

7. A method of forming a seal with a circular hole in a wall comprising the steps of
    (a) inserting a substantially rigid ring into the end portion of an elastomeric resilient elongated sleeve thereby determining the outer diameter of said sleeve radially opposite said ring, the outer diameter of said sleeve with said ring inserted being larger than the diameter of said hole,
    (b) arranging said assembled ring and sleeve in coaxial alignment with said hole, and
    (c) force fitting said assembly by moving it axially and coaxially into said hole.

8. The method of claim 7 wherein the first-mentioned end portion of said sleeve is in the form of a reflexly curved flange, said ring being inserted inside the outer portion of said flange in radially spaced relation from the opposite portion of said sleeve, said outer portion of said flange having an interference fit with said hole.

* * * * *